C. L. MARCUS.
PASS BOOK.
APPLICATION FILED MAR. 29, 1915.

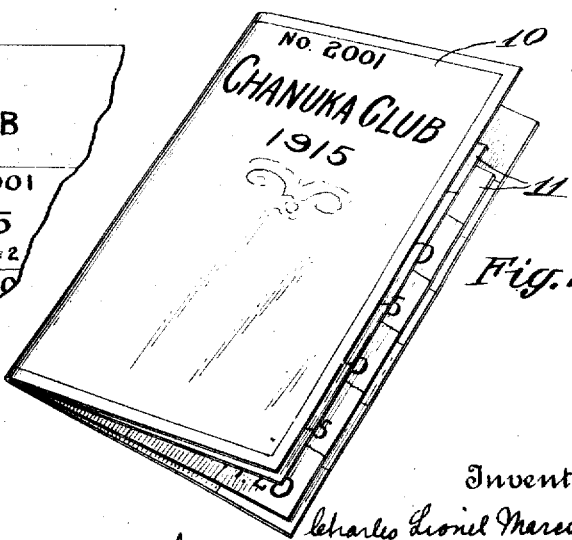

1,239,285.

Patented Sept. 4, 1917.
2 SHEETS—SHEET 2.

Witnesses:
Maurice Lessin
Wm I Cohen

Inventor
Charles Lionel Marcus
By his Attorneys
Ashley & Cohen

UNITED STATES PATENT OFFICE.

CHARLES LIONEL MARCUS, OF NEW YORK, N. Y.

PASS-BOOK.

1,239,285.   Specification of Letters Patent.   Patented Sept. 4, 1917.

Application filed March 29, 1915. Serial No. 17,594.

*To all whom it may concern:*

Be it known that I, CHARLES LIONEL MARCUS, a citizen of the United States, and a resident of New York city, in the county of New York and State of New York, have invented certain new and useful Improvements in Pass-Books, of which the following is a specification.

This invention relates to pass books for banks or other repositories, particularly to a book or paper of this character for use in connection with what are known as savings clubs.

In systems of deposits such as that followed in so-called savings clubs, the depositor is required to deposit certain stated amounts on certain definite dates. These amounts may be very small and it is often found burdensome to keep track of the account and handling the large number of depositors without some special device which would expedite the work of the receiving teller.

For this purpose, I provide a pass book which may be a folder of the size of the usual bank pass book and within the folder are a series of coupons which the receiving teller merely need tear off and stamp the receipt upon a space especially provided, corresponding to the coupon. Thus, the teller need do no writing, preserves for his record merely the detached coupon, while the depositor has the receipt pasted or stamped in his book and from the next unstamped space or from the next coupon, he learns the amount next to be paid, the date on which it is to be paid and the total amount paid up to that date.

The various further objects and advantages of my invention will more fully appear from the detailed description and the features of novelty will be particularly pointed out in the claim.

In the drawings,

Figure 1 illustrates my improved pass book when opened.

Fig. 2 is a view in perspective illustrating the pass book as closed.

Fig. 3 is a fragmental view with some of the coupons shown in Fig. 1 omitted, showing the receipt stamps affixed to the book.

Figures 4, 5:
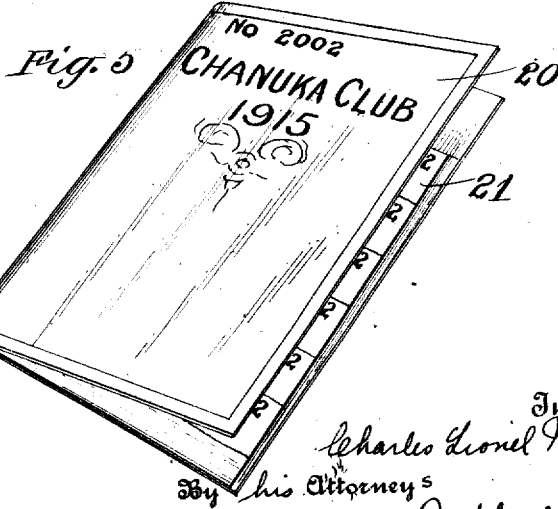
Fig. 4 illustrates a modified form of pass book, showing receipt stamps affixed to the book and the corresponding coupons detached.
Fig. 5 is a view in perspective illustrating the modified form of book closed.

Referring in detail to the drawings, particularly to Figs. 1, 2, and 3, the pass book has the usual cover 10, formed preferably of stiff paper having the suitable insignia on the exterior thereof. Bound within the book is a sheet 11, which is separated by suitable perforations 12, into a series of coupons 13, 13ª, etc. Each coupon bears the serial number of the account, the amount to be paid and date when the amount is due. Usually, in savings club accounts, the amount to be deposited is a progressively increasing sum which is to be deposited, say at the end of every week. Thus, when the coupon is detached, it not only serves as a deposit slip for the teller and obviates the necessity of his writing the amount down, but also serves as an indication to the depositor of the amount next due.

For the purpose of indicating to the depositor an acknowledgment of the receipt of the deposit, the inner surface of the cover of the book is ruled with a tabulation corresponding to the arrangement of the coupons 13, 13ª, etc. The tabulation consists of a number of spaces 14, 14ª, 14ᵇ, etc., each space corresponding to a coupon and containing preferably data indicating the amount due and date together with the amount paid up to that date. (See space 14ᵇ, Fig. 3).

When a deposit is made, the receiving teller tears off a coupon, which then constitutes the deposit slip and stamps, upon the corresponding space of the tabulation, the receipt. This receipt is preferably in the form of a paster 15, 15ª, etc., (Fig. 3), which may contain data such as "Received", together with the amount, date and name of the club. Of course, instead of a paster, a stamp may be used to imprint this data on the proper space.

To further facilitate the work of the receiving teller, the tabulation on the inner surface of the cover is preferably ruled into spaces of the same size as the coupon slips and the corresponding spaces are disposed immediately under the respective coupons. Thus, referring to Fig. 1, it will be noted that the first coupon 13 is for 5¢ and is disposed immediately over the space on the tabulation, indicating 5¢ to be paid. The second space 14ª, it will be noted, has at the top numeral 5, indicating the amount paid to that date, and at the bottom is the numeral 10, (not shown), indicating that 10¢ is to be paid on April 5th, as indicated also by the coupon 13ᵃ immediately over the space 14ᵃ. When the coupon 13 is torn away by the receiving teller, a paster stamp 15 is pasted over the space left vacant by the coupon as appears in Fig. 3. Thus, the teller does not need to look for the space to paste his receipt on. He merely places a stamp over the same point from which he detached the coupon. The space 14ᵇ is shown as uncovered (Fig. 3), the corresponding coupon has just been torn away prior to the affixing of the receipt stamp over the space.

In the modification illustrated in Figs. 4 and 5, the cover 20 has the coupon sheet 21 pasted on one side of the interior face. On the other, directly opposite is formed the tabulation 22, the spaces corresponding exactly to the coupon slips of the coupon sheet. Thus when the first coupon is torn away at the right, the receiving teller affixes the stamp on the first space at the left and so on.

From the above description, it will be seen that my improved pass book serves to provide a receipt to the depositer as well as a reminder to him of the amount and date when the next payment is due. Also the coupons torn away serve as a record to post in the ledger without requiring any writing to be done by the receiving teller. The sticker stamps which serve as receipts may also be used as a check upon the receiving teller. Thus, at the opening of business, each teller may be given a certain amount of these sticker stamps and at the close of the day, the teller returns the amount left and the difference would have to tally with the amount of money received.

I have illustrated my pass book as used particularly in a savings club account in which progressively increasing amounts are deposited. However, it may be understood that my improved pass book is also adapted for accounts of this character in which the same amount is paid on definite dates. In this case, the coupons need merely contain the serial number of the account, date and number of payment without stating the amount.

Various modifications may be resorted to within the scope of this invention without departing from the spirit thereof and the scope and purview of the claim.

Having thus described my invention, I claim as new and desire to secure by Letters Patent:

A depositor's pass book adapted to facilitate club banking transactions, comprising a stiff folding cover and a flexible sheet attached to the cover at its mid-width, said sheet being divided into a plurality of detachable coupons, each coupon bearing data identifying the depositor and amount to be deposited and the date on which said deposit is due to serve as the deposit slip and to be retained by the bank when detached and said cover having on the interior face thereof a plurality of printed forms corresponding in size and number to the coupons and disposed directly thereunder so as to be uncovered when the coupons are detached, said forms containing data identifying the amount already deposited to serve as a record of the account, and the amount to be deposited and the deposit period within which said amount is to be deposited on that date to serve as a reminder to the depositor and adapted to be receipted by a bank official.

Signed at New York city, in the county of New York, and State of New York, this 22nd day of March A. D. 1915.

CHARLES LIONEL MARCUS.

Witnesses:
WM. I. COHEN,
MAURICE LESSIN.